April 16, 1929.  H. W. PROTZELLER  1,709,095
ELECTROMAGNETIC VALVE
Filed Feb. 8, 1926  2 Sheets-Sheet 1

Inventor
Harry W. Protzeller
by Arthur W. Nelson
Atty.

April 16, 1929.   H. W. PROTZELLER   1,709,095
ELECTROMAGNETIC VALVE
Filed Feb. 8, 1926    2 Sheets-Sheet 2

Inventor
Harry W. Protzeller

Patented Apr. 16, 1929.

1,709,095

UNITED STATES PATENT OFFICE.

HARRY W. PROTZELLER, OF EAST CHICAGO, INDIANA, ASSIGNOR TO O. F. JORDAN COMPANY, OF EAST CHICAGO, INDIANA, A CORPORATION OF INDIANA.

ELECTROMAGNETIC VALVE.

Application filed February 8, 1926. Serial No. 86,688.

This invention relates to improvements in electromagnetic valves and it consists of the matters hereinafter described and more particularly pointed out in the appended claims.

The primary object of the invention is to provide a valve of the kind more particularly adapted for heavy duty such as is imposed upon it when forming a part of a rail joint oiler and which is positive in repeated operations and is of such a rugged and simple construction that it will not readily get out of order due to breakage of the parts thereof.

A further object of the invention is to provide such a valve, wherein the valve member proper which is located in a pressure chamber and is held upon its seat by the pressure therein, is so connected with the magnet core, that a relative lost motion or a limited independent movement is provided for whereby the resistance of the valve in its opening movement is not imposed upon the core until the same has started or is in motion.

Another object of the invention is to provide in a valve for this purpose a fluid pressure chamber, which is jacketed to receive a heating medium, whereby the pressure fluid is prevented from congealing in low temperatures and thus make the valve stick upon its seat and impose an increased burden upon the core of the magnet which is the valve lifting member.

These objects of the invention as well as others, together with the many advantages thereof will more fully appear as I proceed with my specification.

In the drawings:—

My improved electro-magnetic valve is herein shown as employed to control the flow or passage of a fluid to the spray nozzles of a rail joint oiler and will be described as such for the purpose of illustration only because as is apparent, it may also be employed for other purposes where its peculiar characteristics makes it advantageous to do so.

Figure 1:
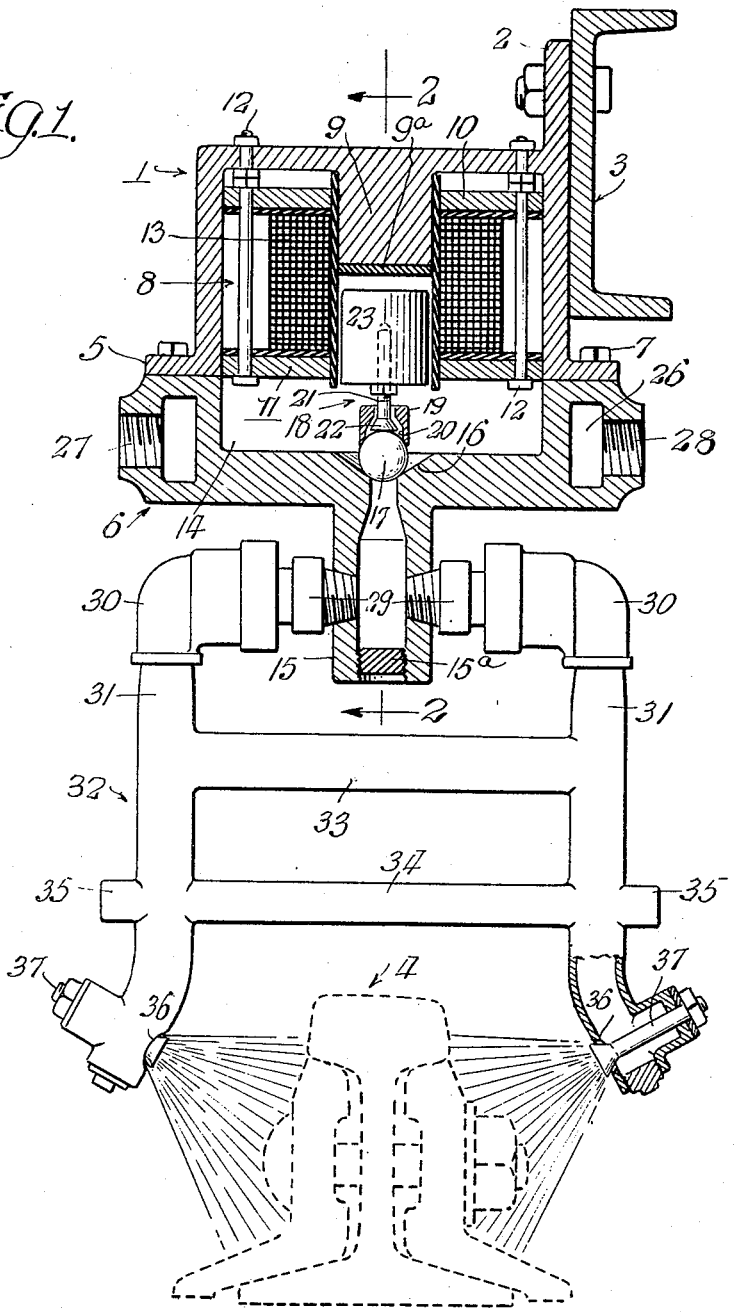
Fig. 1 is a vertical sectional view through one form of electro-magnetic valve embodying my invention as when employed as a part of a rail joint oiling apparatus.
Figure 2:
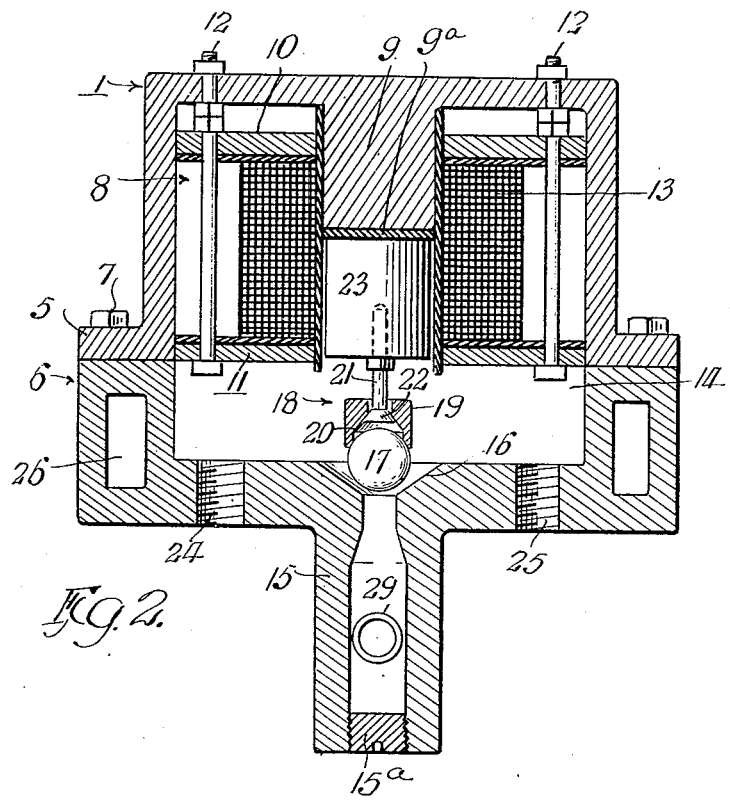
Fig. 2 is another vertical section through the same as taken on the line 2—2 of Fig. 1, with the parts thereof in a position different from that shown in said Fig. 1.
Figure 3:
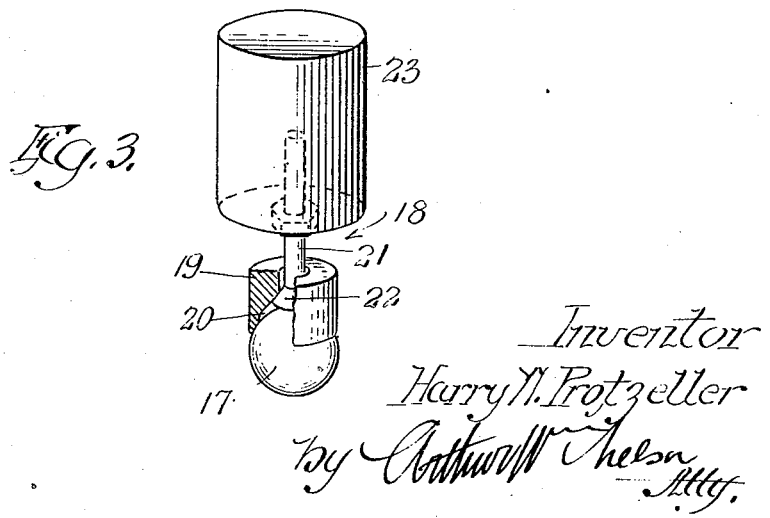
Fig. 3 is a perspective view of the valve stem and core as they appear when removed from the valve casing.

Referring now in detail to that embodiment of the invention illustrated in the accompanying drawings: 1 indicates as a whole, an open bottom magnet casing which includes a vertical flange 2 whereby it may be securely attached in operative position upon one of the side sills or frame members 3 of a vehicle adapted to travel on rails, only one of which is shown herein in dotted lines as at 4 in Fig. 1. The casing 1 includes an outwardly extending radial flange 5 at its bottom end against which fits a hollow base member or plate 6, bolts 7 extending through said flange and into said base member, the structure of which will more fully appear later. In the casing 1 is provided an annular chamber 8 and depending from the top wall and axially therewith is a boss or stud 9. In the chamber 8 is located top and bottom coil supporting plates 10 and 11 respectively suitably secured in place by bolts 12 extending through the top wall of the casing. Between said plates is positioned the annular coil 13 of an electromagnet, said coil being insulated from the casing in any suitable manner.

The base member 6 has an upwardly opening chamber 14 therein which is coextensive with the coil chamber 8 of the casing 1. The chamber 14 constitutes a pressure fluid chamber for the fluid to be sprayed upon the joint plates associated with the rail 4.

Depending from the bottom wall of the base member, coaxial with the boss 9 of the casing 1 is a tubular boss 15 the bottom end of which is closed by a removable clean out plug 15ª. In the bottom wall of the base member 6 is provided a tapered valve seat 16 upon which normally seats the head 17 of a valve member 18 which controls the passage of the fluid from the chamber 14 into the sleeve 15. As shown herein, the valve head 17 is in the form of a ball and fixed thereto is a member 19 having an opening 20 therein, said opening being of a larger diameter at its bottom end than it is at its top end. 21 indicates a valve stem having a head 22 on the bottom end thereof arranged in the opening 20, while the top end of the stem is adjustably secured in the bottom end of a core 23 associated with the coil 13. As best shown in Fig. 1, a somewhat loose fit attains between the stem 21 and member 19 whereby the member 19 and ball 17 may rotate with respect to the stem so as to present new seating engagements between the ball and valve seat 16. Again said loose fit provides a lost motion or independent relative movement between the stem and member 19 so that when the coil is energized, the stem receives a start or impetus before it picks up the member 19 to lift the ball from off its seat. This lost motion feature is advantageous, because it imposes the load or resistance upon the magnet, not at the start of movement of the core, but thereafter so that the bearing down tendency of the fluid in the chamber 14 to hold the valve member 17 upon the seat 16 is readily overcome. In the bottom wall of the base member 6 is provided an inlet 24 for the fluid, connected up to a source of supply under pressure and associated with said inlet is an auxiliary outlet 25, suitably connected with said source, and through which said fluid is returned to the source of supply when the valve 17 is engaged upon the seat 16. Thus a circulation of the spraying fluid is maintained when the valve 18 is closed. As the fluid used for spraying is a low grade, thick oil, means is provided in the base member to keep the same warm to prevent its congealing and to increase its fluidity. To this end I provide a jacket space 26 through which passes a suitable heating medium such as the exhaust from the motive power of the vehicle to which the casing 1 is attached, there being an inlet 27 and an outlet 28 in the base member for this purpose.

Secured to the sleeve 15 at diametrically opposite points in a plane extending transversely to the rail 4 are nipples 29—29 to each of which is operatively connected a swing joint elbow 30—30. To said fittings is secured the top ends of upright tubular members 31—31 of a spray nozzle head indicated as a whole at 32, said members being cross connected near their top ends by a pressure equalizing conduit 33 and near their bottom ends by a cross bar 34, there being laterally extending studs 35 on said members 31—31 in line with the cross bar. Suitable means (not shown) are connected to said studs by which the nozzle head 32 as a whole may be swung into and out of operative position with respect to the rail 4. The bottom end of each member 31, is turned outwardly and is plugged as shown and in each end and facing the rail is a valve seat like discharge orifice 36 with which a valve stem 37 of a spray nozzle is associated and is adapted to be held open by pressure of the fluid in said members 31.

In the movement of the vehicle along the rails, suitable means thereon and not herein shown engages the plates of the rail joints and closes the circuit to the coil 13 and holds the same closed as long as said means engages the joint plates. When said circuit is closed, the coil is energized to attract the core 23 and move the same upwardly until it engages the boss 9 which of course limits its movement. As the core is moved upwardly it carries the stem 21 along with it. After said stem has started in its movement, it picks up the member 19, and overcoming the pressure of the fluid in the chamber 14 lifts the valve head 17 off the seat 16. Fluid under pressure, then passes down the sleeve 15 through the nipples 29 into the tubular members 31 (the pressure then being equalized therein because of the conduit 33) to the spray nozzles to be discharged therefrom in the form of a conical spray upon the joint plates associated with the rail 4. As soon as the vehicle passes said plates, the coil 13 is deenergized and the core 23 being relatively heavy will descend by gravity and cause the valve head or ball 17 to again engage upon the seat 16 and close off the passage of the spraying fluid therethrough.

My improved electromagnetic valve is not only simple in construction but is strong and rugged and will amply withstand the heavy duty strains imposed upon it in use. It may be easily taken apart for cleaning or repair when necessary and may be readily reassembled.

While in describing my invention I have referred to the same as employed in connection with a rail joint oiler and have set forth certain details of construction as well as form and arrangement of the parts thereof, the same is intended as by way of illustration only and I therefore do not wish to be limited thereto except as may be pointed out in the appended claims.

I claim as my invention:

1. In combination with means providing a chamber for a fluid under pressure and including a valve seat, an electromagnet in said chamber and including a movable part, a valve member adapted to engage upon said seat and a stem adjustably connected to said movable part and carrying said valve member and permitting a limited independent movement between the two.

2. In combination with means providing a chamber for a fluid under pressure and including a valve seat, an electromagnet in said chamber and including a movable member, a ball valve member adapted to engage upon said seat, a stem having a screw threaded adjustment with said movable member of said magnet and a device carried by the ball and engaged by said stem and providing a limited independent movement between said stem and ball valve member.

3. In combination with means providing a chamber for a fluid under pressure and including a valve seat, an electromagnet including a movable part, a valve member adapted to engage upon said seat and a stem adjustably connected to said movable part and carrying said valve member and permitting a limited independent unopposed movement between the two.

4. In combination with means providing a chamber for a fluid under pressure and including a valve seat, an electromagnet including a movable part, a ball valve member adapted to engage upon said seat, a stem having a screw threaded engagement with said movable part of said magnet and a device carried by the ball and engaged by the stem and providing a limited independent movement between said stem and ball valve member.

In testimony whereof, I have hereunto set my hand, this 27th day of January, 1926.

HARRY W. PROTZELLER.